United States Patent
Fukasawa (10) Patent No.: US 7,640,576 B2
(45) Date of Patent: Dec. 29, 2009

(54) PRINT SYSTEM, APPARATUS, AND METHOD FOR PERFORMING PRINTING BASED ON DOCUMENT INFORMATION STORED IN DOCUMENT SERVER

(75) Inventor: Nobuaki Fukasawa, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 792 days.

(21) Appl. No.: 10/754,358

(22) Filed: Jan. 8, 2004

(65) Prior Publication Data

US 2004/0143566 A1    Jul. 22, 2004

(30) Foreign Application Priority Data

| Jan. 21, 2003 | (JP) | ............................. 2003-012635 |
| Nov. 21, 2003 | (JP) | ............................. 2003-392626 |

(51) Int. Cl.
*H04L 29/00*    (2006.01)

(52) U.S. Cl. .............................. 726/3; 358/1.15; 710/20

(58) Field of Classification Search ..................... 726/3; 358/1.15; 710/20; 359/1.15
See application file for complete search history.

(56) References Cited

U.S. PATENT DOCUMENTS

| 6,778,289 | B1 * | 8/2004 | Iwata | ........................ 358/1.15 |
| 6,975,419 | B2 * | 12/2005 | Staas et al. | ................... 358/1.15 |
| 7,050,192 | B2 * | 5/2006 | Shima | ........................ 358/1.18 |
| 7,428,578 | B1 * | 9/2008 | Hull et al. | .................... 709/206 |
| 2002/0196460 | A1 * | 12/2002 | Parry | ........................ 358/1.15 |
| 2004/0215671 | A1 * | 10/2004 | Hyakutake et al. | ........... 707/203 |

FOREIGN PATENT DOCUMENTS

| JP | 10-011343 | 1/1998 |
| JP | 10-307846 | 11/1998 |
| JP | 11-110157 | 4/1999 |
| JP | 11-205558 | 7/1999 |
| JP | 10-359718 | 6/2000 |
| JP | 2000-181674 | 6/2000 |
| JP | 2001-249783 | 9/2001 |
| JP | 2002-032205 | 1/2002 |
| JP | 2002-157096 | 5/2002 |
| JP | 2002-157278 | 5/2002 |
| WO | 99/23581 | 5/1999 |

\* cited by examiner

*Primary Examiner*—Ellen Tran
(74) *Attorney, Agent, or Firm*—Canon USA Inc IP Div (57) ABSTRACT

The present invention provides a print system having an enhanced operability for printing document information transmitted/received through a network. In this system, documents stored in a database are searched for so as to obtain a search result, and a user specifies a document to be printed from among documents indicated by the search result in a browser screen. Accordingly, a printer extracts information about a storage location of the document and downloads the information of the document stored in a document server thereto.

8 Claims, 13 Drawing Sheets

| | |
|---|---|
| DIRECTORY INFORMATION | ~9999 |
| . . . | |
| INSTALL PROGRAM | ~9998 |
| . . . | |
| REFERENCE PRINT PROGRAM | ~9997 |
| . . . | |

PRINT SYSTEM, APPARATUS, AND METHOD FOR PERFORMING PRINTING BASED ON DOCUMENT INFORMATION STORED IN DOCUMENT SERVER

BACKGROUND OF THE INVENTION

1. Field of the Invention

The present invention relates to a print system. In particular, the present invention relates to a network print system in which a printer and a document server are connected to a network.

2. Description of the Related Art

In a known print system, each of a document-search function and a printing function operates individually, and both functions do not cooperate with each other organically.

In the known print system, a user's performance of obtaining location information of a document by browsing documents accessible through a network is not directly connected to a document-search function of the print system. Therefore, the user has to write down the location information of a document so as to record information required for printing. Also, the user has to manually input the recorded information to a predetermined space in a print display.

SUMMARY OF THE INVENTION

The present invention has been made in view of the above-described problems, and it is an object of the present invention to provide a print system having an enhanced capability for printing document information transmitted/received through a communication network.

According to a print system of the present invention, a user need not perform cumbersome operations, for example, writing down storage location information of a document.

That is, in the print system according to the present invention, printing of a selected document is started when a user selects a desired document out of a list of documents found by a search. Therefore, a key-input operation by the user for specifying a document to be printed can be simplified and input errors caused in the key-input operation can be reduced.

Further objects, features, and advantages of the present invention will become apparent from the following description of the preferred embodiment with reference to the attached drawings.

DESCRIPTION OF THE PREFERRED EMBODIMENT

Hereinafter, an embodiment of a print system of the present invention will be described with reference to the drawings. As described below, in the print system of the embodiment, a printer and a document server are connected to a network, documents managed by the document server are browsed by using a function provided in the printer, a user selects a document from among the browsed documents, and the selected document is printed.

Overall Configuration of a Print System 10

Figure 1:
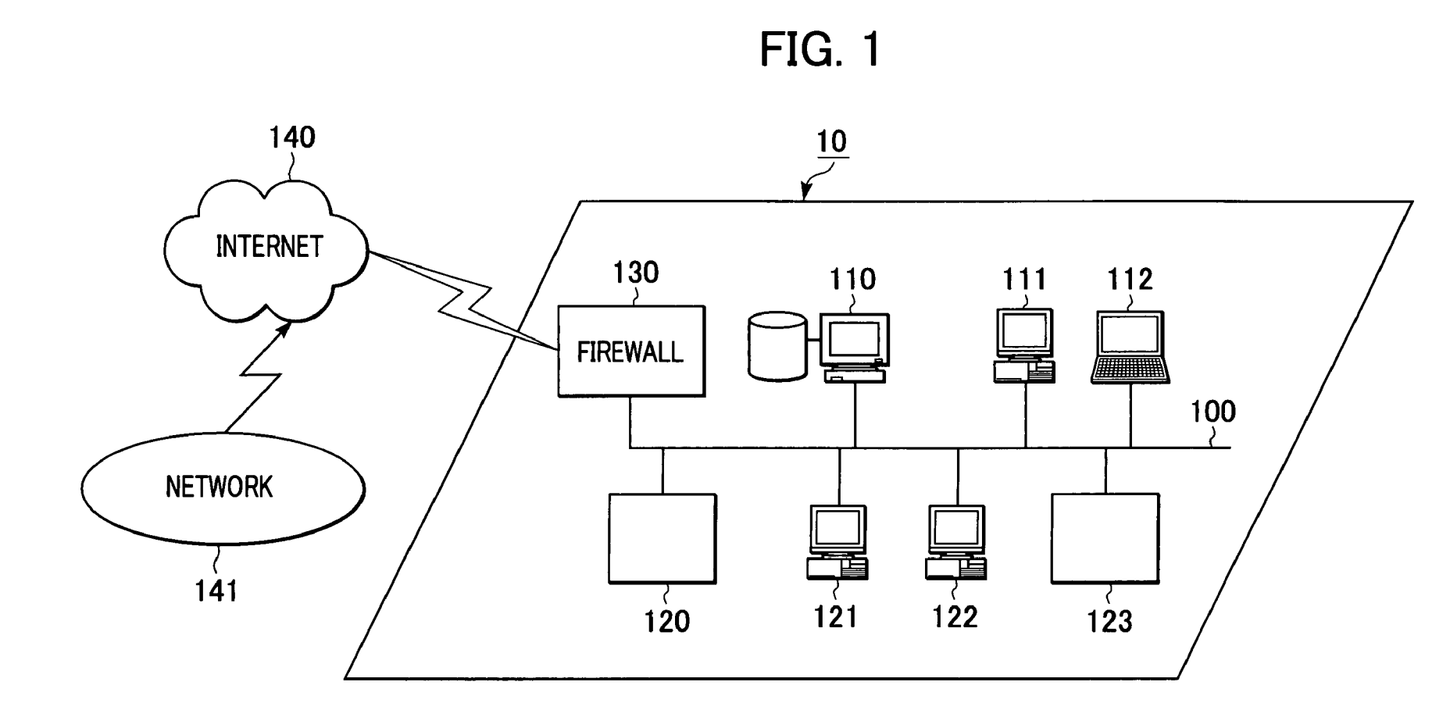
FIG. 1 shows a configuration of a print system.

FIG. 1 shows an example of a hardware structure of a print system 10 of the embodiment. In FIG. 1, the print system 10 includes document server computers (hereinafter referred to as server PCs) 110, 111, and 112; a single function printer (SFP) 120; a multi function printer (MFP) 123; and user terminals 121 and 122, and these elements are connected to a LAN 100.

Each of the server PCs 110, 111, and 112 (hereinafter, only the server PC 110 will be described) includes a network database server (for example, lightweight directory access protocol server (LDAP server)) storing document information. The SFP 120 and the MFP 123 will be collectively called a printer 120. Although not shown, other devices, e.g., multifunction devices (MFDs), within the spirit and scope of the present invention can be employed.

The printer 120 includes a network database client (for example, lightweight directory access protocol client (LDAP client)) which can browse documents stored in the server PC 110.

In the print system 10, when a user inputs a browse command to the server PC 110 through the printer 120, the server PC 110 transmits information about documents which are currently stored therein (for example, a list of documents) to the printer 120. Then, the user selects a desired document from among the documents and instructs the printer 120 to print the selected document. Accordingly, the printer 120 downloads information of the selected document from the server PC 110 so as to perform printing based on the document information.

Configuration of Server PC 110

Figure 2:
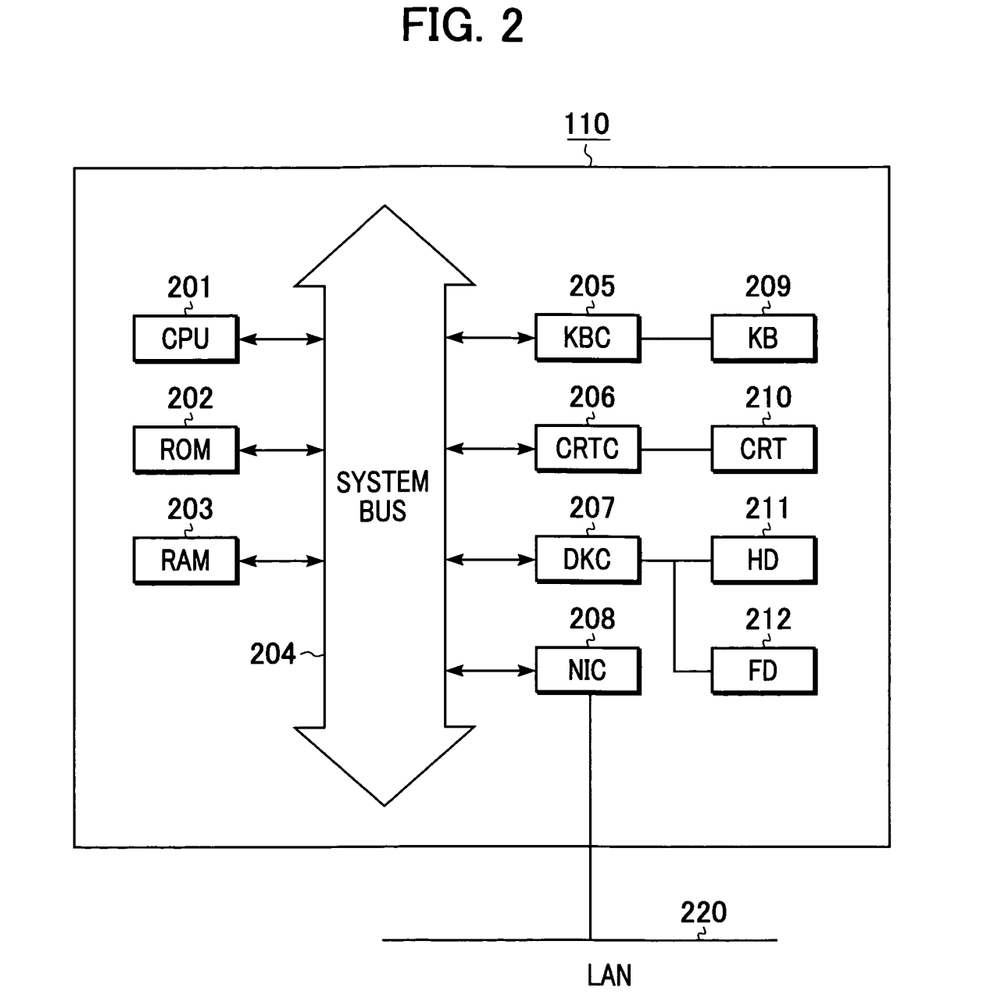
FIG. 2 shows an example of an internal configuration of a computer system serving as a document server.

FIG. 2 is a block diagram showing the overview of an internal configuration of a computer system which can serve as the server PC 110.

In FIG. 2, the server PC 110 stores and manages document information. In the server PC 110, a CPU 201 controls devices connected to a system bus 204, and executes a document server program which is supplied from a ROM 202, a hard disk (HD) 211, or a floppy disk drive (FD) 212.

A RAM 203 functions as a main memory or a work area for the CPU 201. A keyboard controller (KBC) 205 controls pointing/input from a keyboard (KB) 209 and a pointing device or the like (not shown). A CRT controller (CRTC) 206 controls display in a CRT display (CRT) 210.

A disk controller (DKC) 207 controls an access to the HD 211 and the FD 212. A boot program, various applications, an edit file, a user file, a document server program, and so forth are recorded in the HD 211.

A network interface card (NIC) 208 transmits/receives data to/from a network printer, another network apparatus, or another PC through a LAN 220. In the print system 10 of the embodiment, the LAN 220 corresponds to the LAN 100 shown in FIG. 1.

Configuration of Printer 120

Figure 3:
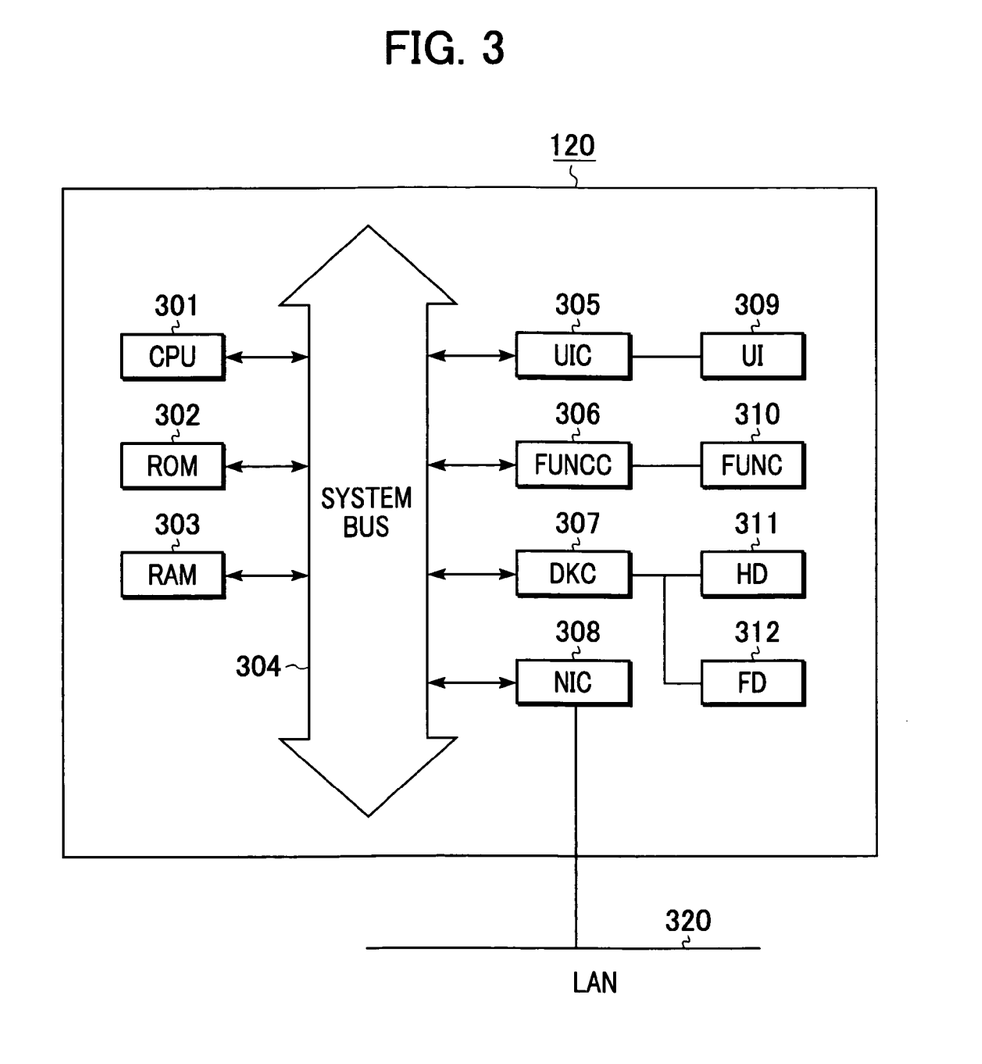
FIG. 3 shows an example of an internal configuration of a printer (SFP and MFP).

FIG. 3 is a block diagram showing the overview of an internal configuration of a computer system which can serve as the printer 120. The printer 120 shown in FIG. 3 starts up a reference print program so as to perform printing.

In the printer 120, a CPU 301 controls devices connected to a system bus 304, and executes a reference print program which is supplied from a ROM 302, a hard disk (HD) 311, or a floppy disk drive (FD) 312.

A RAM 303 functions as a main memory or a work area for the CPU 301. A user interface controller (UIC) 305 controls display and input of information to a user interface (UI) 309.

A function controller (FUNCC) 306 controls realization of a function (FUNC) 310, which is a function peculiar to each device.

If the printer 120 is a monochrome printer, the printer 120 includes a monochrome print engine controller as the FUNCC 306 and a monochrome print engine as the FUNC 310.

On the other hand, if the printer 120 is a color printer, the printer 120 includes a color print engine controller as the FUNCC 306 and a color print engine as the FUNC 310. Further, if the printer 120 is the MFP 123, the printer 120 includes a FUNCC 306 and a FUNC 310 for MFP.

A disk controller (DKC) 307 controls an access to the HD 311 and the FD 312. Various applications, data files, a print program, and so forth are recorded in the HD 311.

A network I/F controller (NIC) 308 transmits/receives data to/from another apparatus or another PC through a LAN 320. In the print system 10 of the embodiment, the LAN 320 corresponds to the LAN 100 shown in FIG. 1.

Figure 4:
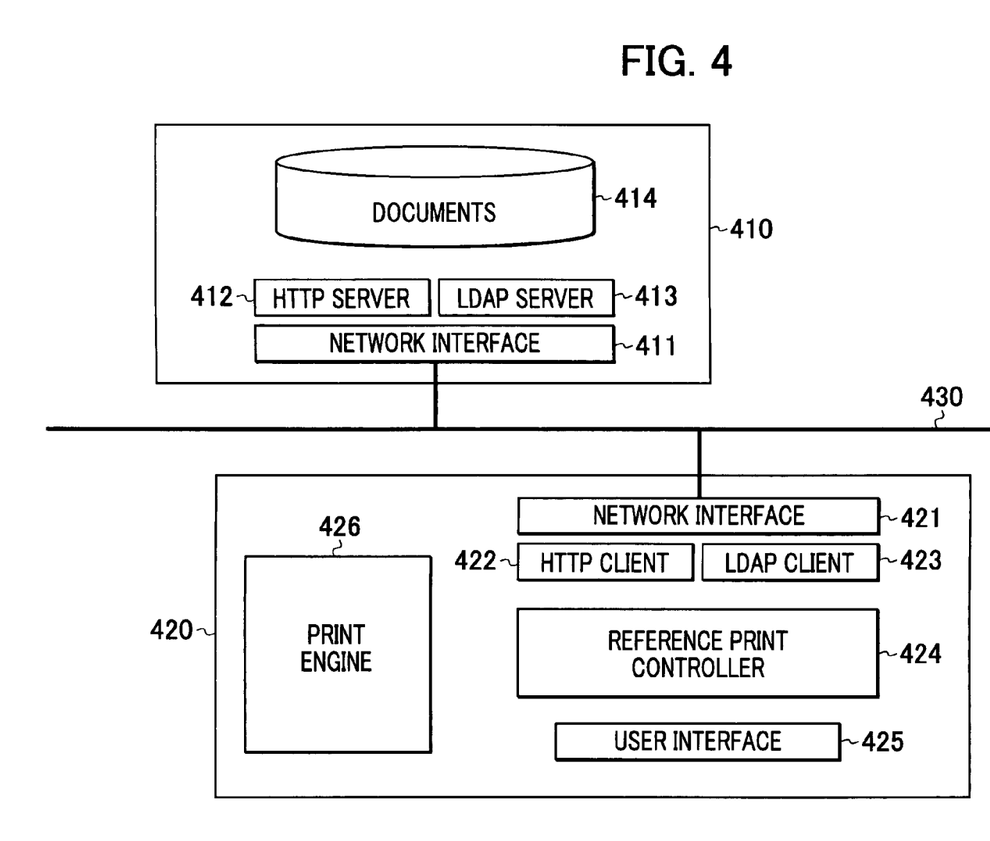
FIG. 4 is a model diagram illustrating a software function of the document server computer and the printer.

FIG. 4 is a model diagram illustrating the server PC 110 and the printer 120. Reference numeral 410 in FIG. 4 corresponds to the server PC 110 shown in FIG. 1 and reference numeral 420 corresponds to the printer 120 shown in FIG. 1. Also, a LAN 430 corresponds to the LAN 100 shown in FIG. 1, and the server PC 410 and the printer 420 work in conjunction with each other through the LAN 430.

First, the software structure and each function of the server PC 410 will be described. A network interface 411 is used for connecting the server PC 110 to the LAN 430. A hypertext transfer protocol (HTTP) server 412 is used for downloading predetermined document information from a database 414. An LDAP server 413 is used for searching for document information stored in the database 414.

The database 414 stores document information and is managed by the LDAP server 413. The HTTP server 412 serves as a document information transfer unit and a storage location information receiving unit.

Next, the printer 420 will be described. A network interface 421 is used for connecting the printer 120 to the LAN 430. An HTTP client 422 corresponds to the HTTP server 412, and is used for receiving document information which is downloaded from the server PC 110 to the printer 120.

An LDAP client 423 corresponds to the LDAP server 413, and is used for instructing the server PC 110 to search for documents. A reference print controller 424 controls reference printing (herein, it means that document information is downloaded from the database 414 and printing is performed based on the document information). A user interface (UI) 425 is used for inputting/outputting data by/to a user. A print engine 426 is used when the printer 120 performs printing.

The HTTP client 422 serves as a document information receiving unit. Also, the reference print controller 424, the LDAP server 413, and the LDAP client 423 serve as a browsing unit. Further, the LDAP server 413 serves as a search result transmitting unit and the reference print controller 424 serves as a search result holding/extracting unit. Still further, the user interface (UI) 425 serves as a search result display unit.

Operation of Print System 10

Hereinafter, an operation of the print system 10 will be described with reference to FIG. 4.

When a user operates the user interface (UI) 425 of the printer 420 so as to request browse of documents, the browse request is transmitted to the reference print controller 424. In this case, a browser screen for inputting a keyword required for searching for documents is presented to the user through the UI 425. Accordingly, the user inputs an arbitrary keyword in the browser screen.

Next, the reference print controller 424, to which the request for browsing documents is input, generates a document search request for requesting a search for documents stored in the database 414 based on the input keyword, and the generated request is transmitted to the LDAP client 423.

Then, the LDAP client 423 transmits the document search request to the LDAP server 413 of the server PC 410 through the network interface 421 of the printer 420, the LAN 430, and the network interface 411 of the server PC 410.

The LDAP server 413 of the server PC 410 receives the document search request, which has been generated based on the browse request from the user, from the printer 420, searches the database 414 for document(s) including the keyword input in the browser screen, and transmits a search result to the LDAP client 423.

Transmission/reception of data between the PC server 410 and the printer 420 is performed through the network interfaces 411 and 421 and the LAN 430. Also, any type of searching method based on a keyword may be used, including exact matching and fuzzy matching.

The LDAP client 423 outputs the search result from the LDAP server 413 to the reference print controller 424. The reference print controller 424 performs control so that the search result is held in a predetermined recording area and that the UI 425 displays a page of the search result. Accordingly, a list of documents is shown to the user.

When the user selects a desired document from the list of documents, which are displayed by the UI 425, identification information (for example, name of document) for identifying the selected document is transmitted to the reference print controller 424 together with a print request.

The reference print controller 424, which has received the print request, refers to the search result held in the predetermined recording area (for example, RAM 303 shown in FIG. 3), in order to extract a uniform resource locator (URL), which is information about the storage location of the selected document and which is identification information for identifying the document. Then, the reference print controller 424 transmits a download request in which the URL is specified to the HTTP client 422.

The HTTP client 422 receives the request for downloading the document information and transmits the download request (GET method) in which the URL is specified to the HTTP server 412. The HTTP server 412 receives the download request, extracts document information stored in the specified URL from the database 414, and transmits the document information to the HTTP client 422.

The HTTP client 422 transmits the document information from the HTTP server 412 to the reference print controller 424. The reference print controller 424 transmits the document information from the HTTP client 422 to the print engine 426 and waits for the print engine 426 to finish printing based on the document information.

When the print engine 426 finishes printing, it notifies the reference print controller 424 of a print result. Then, the reference print controller 424 controls the UI 425 so that the print result is notified the user. The print result may indicate any of the following options: (1) that printing has been successfully completed, (2) printing has been ended in failure, or (3) an error has occurred.

The configuration of the print system 10 shown in FIG. 4 is only an example, and another configuration can be adopted. For example, the HTTP server 412 and the HTTP client 422 can be replaced by other data transfer protocols (for example, file transfer protocol (FTP)). Also, the LDAP server 413 and the LDAP client 423 can be replaced by other database controllers.

Figure 5:
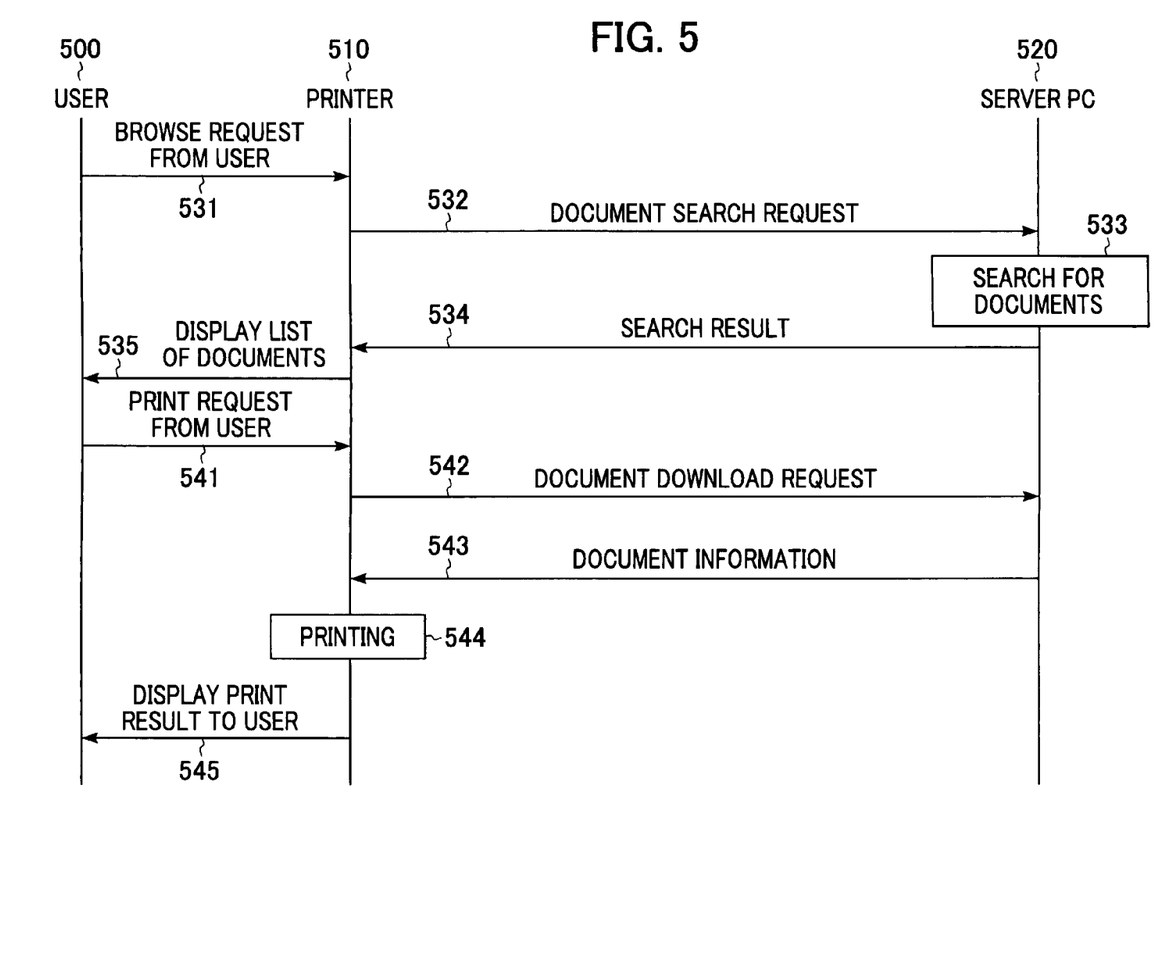
FIG. 5 illustrates a sequence of transfer/transition of requests and instructions among a user, the printer, and the document server computer.

FIG. 5 is a sequence diagram showing transition of information which is transmitted/received by a user 500, a printer 510, and a server PC 520 when the print system 10 of the embodiment performs printing. The printer 510 is equivalent to the printer 120, which is indicated with reference numeral 420 in FIG. 4, and the document server 520 is equivalent to the server PC 110, which is indicated with reference numeral 410 in FIG. 4.

As shown in FIG. 5, the printer 510 receives a browse request and a keyword from the user 500 (531), and transmits a document search request to the server PC 520 (532). The server PC 520 searches the database for document(s) based on the keyword (533), and transmits a search result to the printer 510 (534).

The printer 510 receives the search result and displays a list of documents to the user 500 (535). The user 500 selects a document to be printed from among the documents on the list, and transmits a print request to the printer 510 (541).

The printer 510 receives the print request from the user 500 and transmits a document download request to the server PC 520 (542). Then, the server PC 520 transmits information about the document selected by the user 500 to the printer 510 (543). The printer 510 receives the document information, performs printing (544), and displays a print result to the user 500 (545).

Figure 6:
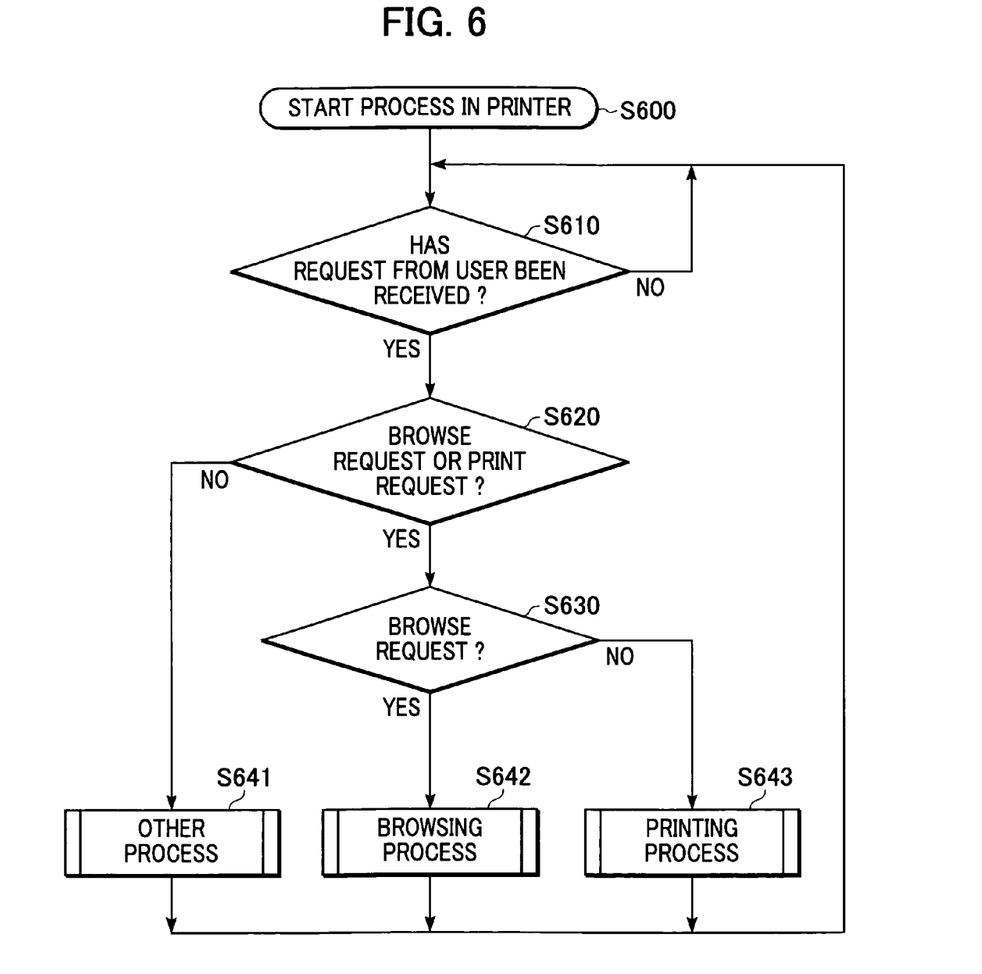
FIG. 6 is a flowchart illustrating a printing process performed in the printer.

FIG. 6 is a flowchart showing a printing process performed in the printer 120. For example, the CPU of the printer 120 executes the process based on a program according to the flowchart shown in FIG. 6.

As shown in FIG. 6, after the process in the printer 120 is started in step S600, a request from a user is waited for, and it is determined whether a request has been transmitted from the user in step S610. When a request has been transmitted, the process proceeds to step S620. In step S620, it is determined whether the request from the user is a browse request or a print request.

If the request is a browse request or print request, the process proceeds to step S630, and otherwise, the process proceeds to step S641. In step S630, it is determined whether the request is a browse request or a print request. If the request is a browse request, the process proceeds to step S642, and if the request is a print request, the process proceeds to step S643.

In step S641, a process for the request other than a browse request and print request is performed. In step S642, a browsing process is performed, and in step S643, a printing process is performed. After the process of step S641, S642, or S643 has been performed, the process returns to step S610, so as to wait for a request from the user again.

Figure 7:
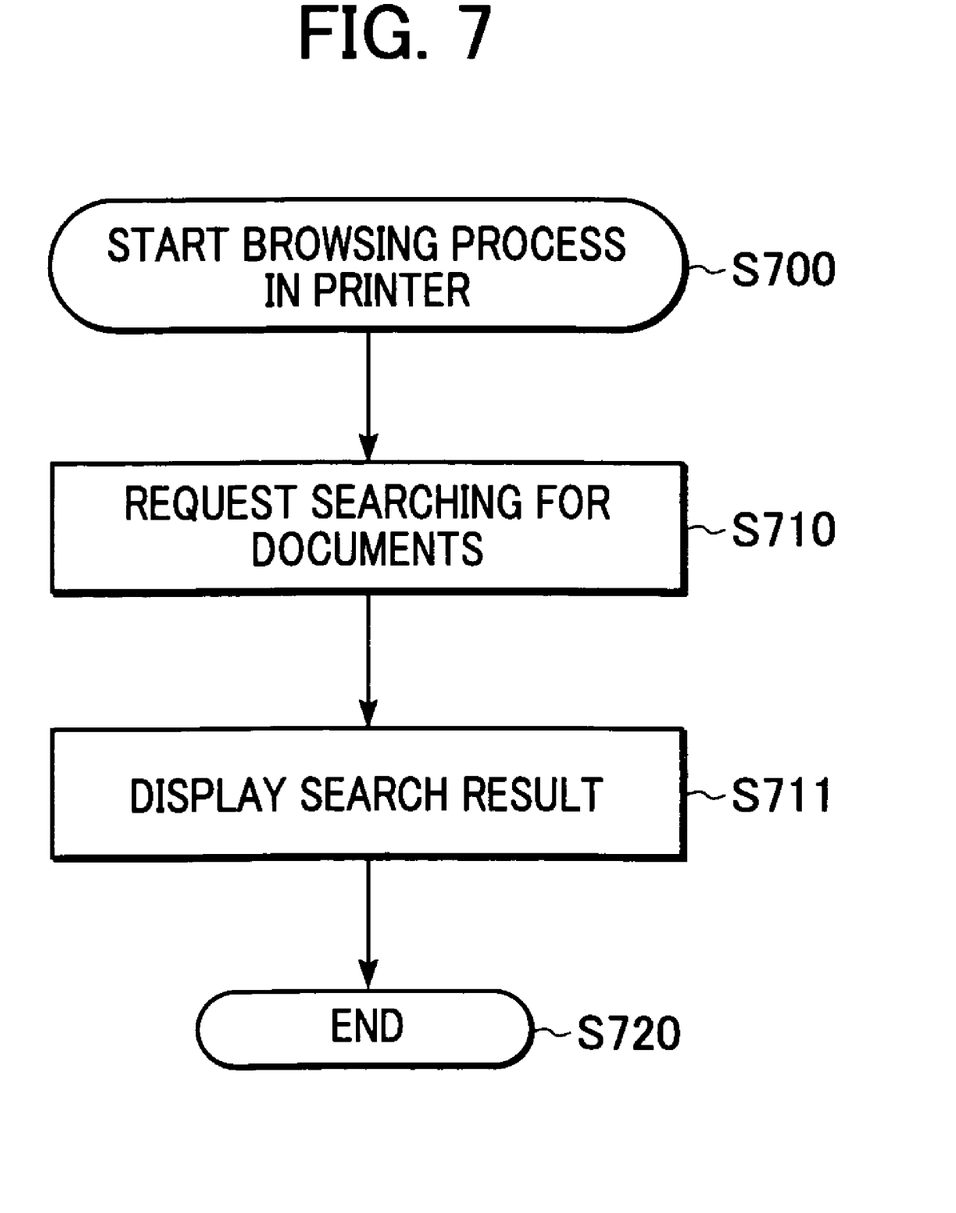
FIG. 7 is a flowchart illustrating a specific procedure of a browsing process in the flowchart shown in FIG. 6.

FIG. 7 shows the browsing process performed in step S642 of the flowchart shown in FIG. 6. For example, the CPU of the printer 120 performs the browsing process based on a program according to the flowchart shown in FIG. 7.

As described above with reference to FIG. 4, the browsing process in the printer is started in step S700. Then, the LDAP client 423 of the printer 120 transmits a document search request to the server PC 110 (step S710).

Then, the printer 120 performs a process for receiving a document search result from the server PC 110 (step S710). Then, in step S711, the printer 120 displays a list of documents based on the search result in the UI 425 shown in FIG. 4, so as to complete the browsing process of step S642 (step S720).

Figure 8:
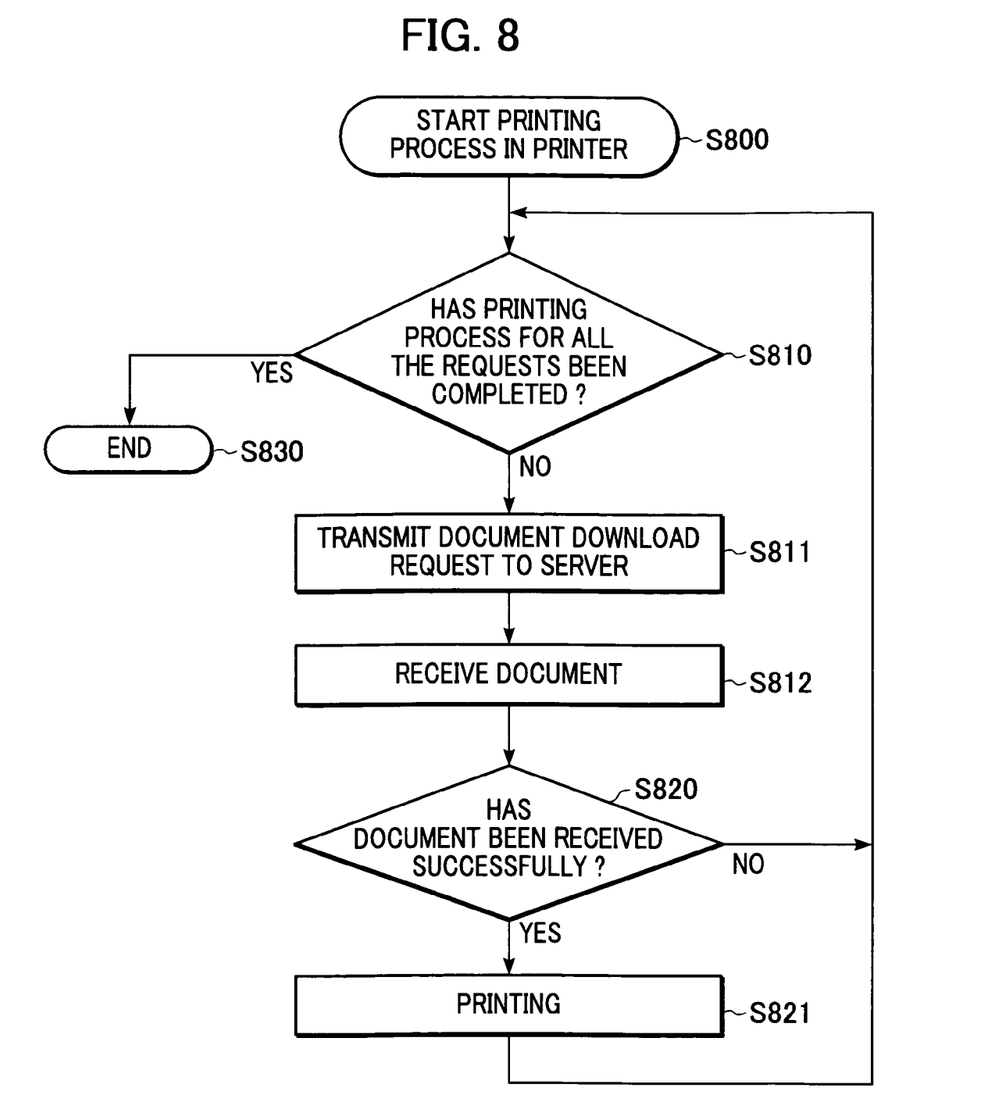
FIG. 8 is a flowchart illustrating a specific procedure of a printing process in the flowchart shown in FIG. 6.

FIG. 8 shows the printing process performed in step S643 of the flowchart shown in FIG. 6. For example, the CPU of the printer 120 performs the printing process based on a program according to the flowchart shown in FIG. 8. In the printing process of the embodiment shown in FIG. 8, a plurality of print requests are transmitted from the user to the printer 120.

First, the printing process in the printer is started in step S800. Then, in step S810, it is determined whether printing for all the print requests from the user has been completed. If a print request remains to be processed, the process proceeds to step S811. On the other hand, if printing for all the print requests from the user has been completed, the process proceeds to step S830, and the printing process is completed.

In step S811, the HTTP client 422, which has been described with reference to FIG. 4, transmits a request for downloading document information to the server PC 110. In this download request, a URL corresponding to the document information is specified. Then, in step S812, the HTTP client 422 receives the document information which has been downloaded from the server PC 110.

In step S820, it is determined whether the document information has been successfully received in step S812. If the document information has been successfully received, the process proceeds to step S821. Otherwise, the process returns to step S810, so as to process a next print request.

In step S821, the print engine 426 shown in FIG. 4 performs printing based on the downloaded document information. After the printing has been completed, the process returns to step S810, so as to process a next print request.

Figure 9:
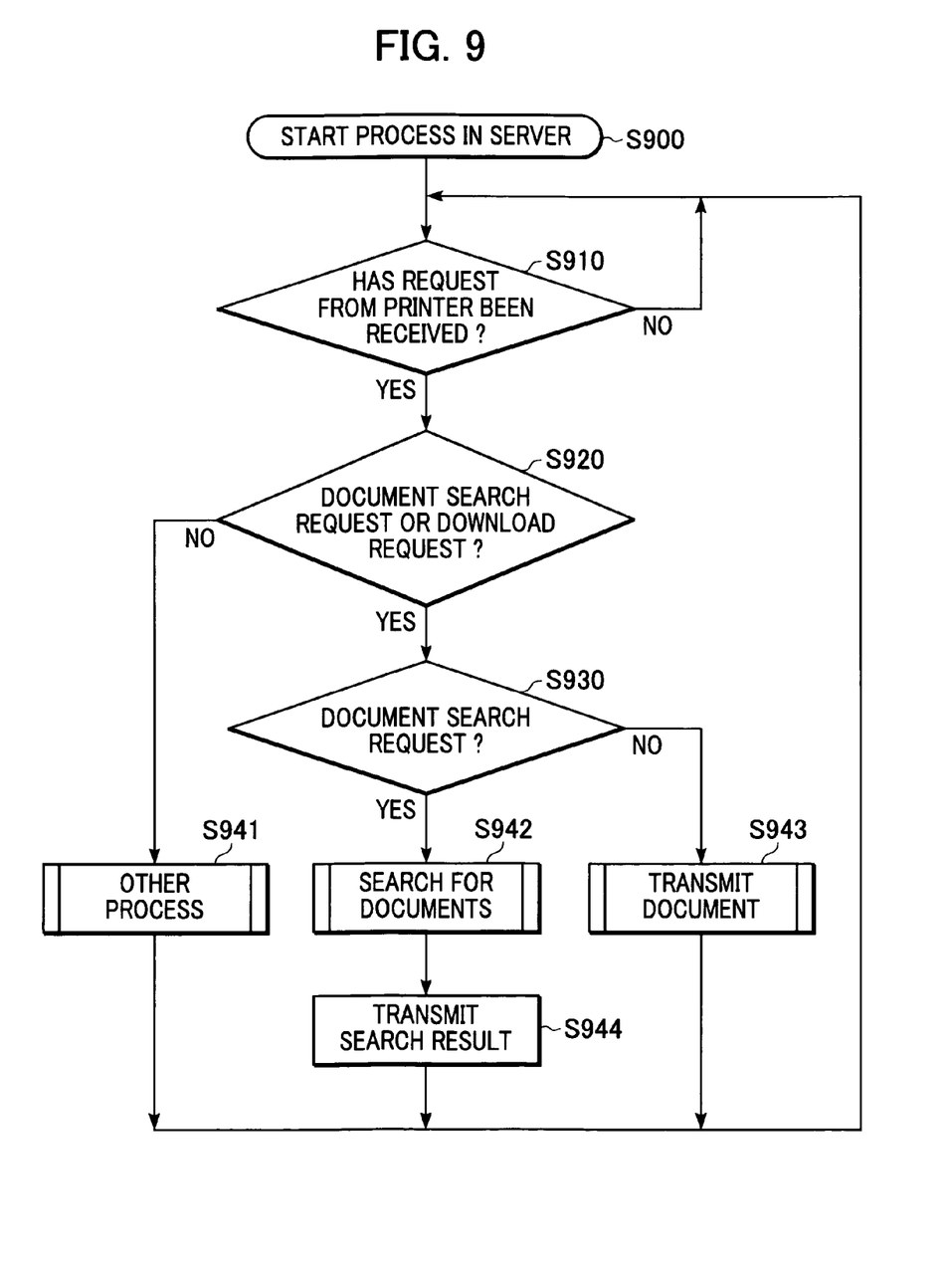
FIG. 9 is a flowchart illustrating a process performed in the document server computer when printing is performed.

FIG. 9 is a flowchart showing a process performed by the server PC 110 when printing is performed. For example, the CPU of the printer 120 performs a process based on a program according to the flowchart shown in FIG. 9.

As shown in FIG. 9, a process in the server side is started in step S900. Then, a request from the printer 120 is waited for and it is determined whether a request from the printer 120 has been received in step S910. If a request has been received, the process proceeds to step S920.

In step S920, it is determined whether the request from the printer 120 is a document search request or a download request. If the request is a document search request or a download request, the process proceeds to step S930, so as to determine whether the request is a document search request. On the other hand, if it is determined that the request from the printer 120 is neither a document search request nor a download request in step S920, the process proceeds to step S941.

If the request is determined to be a document search request in step S930, the process proceeds to step S942. If the request is determined to be a download request, the process proceeds to step S943.

In step S941, a process other than a document search process and a document information transmitting process is performed. Then, the process returns to step S910, where the server waits for a request from the printer 120.

In step S942, the LDAP server 413 shown in FIG. 4 receives the document search request from the printer 120, that is, from the user, and searches the database 414 for documents. Then, a search result is transmitted to the printer 120 in step S944, and the process returns to step S910 so as to wait for a request from the printer 120 again.

In step S943, the HTTP server 412 shown in FIG. 4 receives the download request from the printer 120, that is, from the user, and transmits the requested document information to the printer 120. Then, the process returns to step S910, so as to wait for a request from the printer 120 again.

Figure 10:
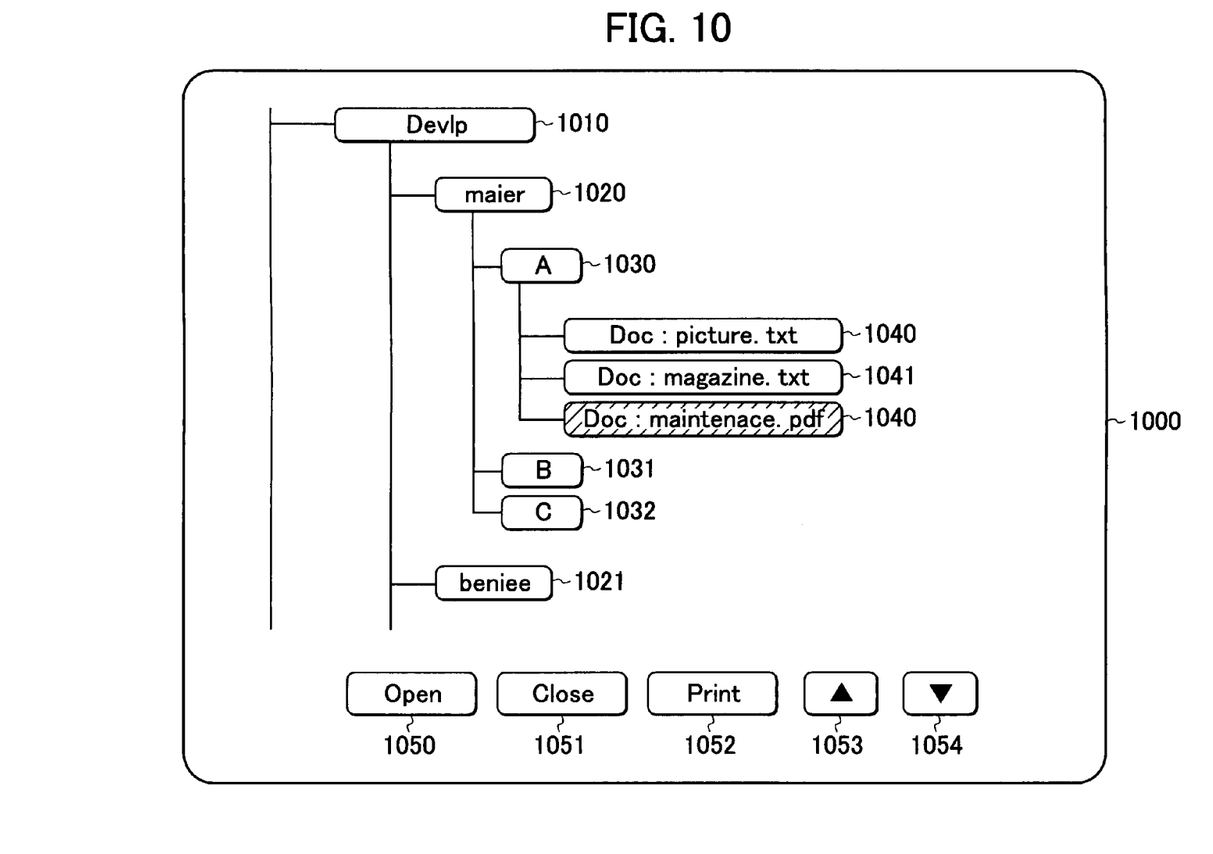
FIG. 10 shows an example of a browser screen displayed in the printer to the user.

FIG. 10 shows an example of the UI 425 shown in FIG. 4. A list of documents based on the search result received by the LDAP client 423 is shown in FIG. 10.

"Devlp" 1010 shown in FIG. 10 is the name of a directory on the network. A directory "maier" 1020 and a directory "beniee" 1021 are sub directories of the directory "Devlp" 1010.

Further, a directory "A" 1030, a directory "B" 1031, and a directory "C" 1032 are sub directories of the directory "maier" 1020, which is managed by the server PC 110.

A document 1040 is stored in the directory "A" 1030, and the name thereof is "picture.txt". Likewise, the name of a document 1041 is "magazine.txt" and the name of a document 1042 is "maintenance.pdf", which are stored in the directory "A" 1030.

Each of the documents "picture.txt", "magazine.txt", and "maintenance.pdf" includes a keyword input by the user. The search result from the server includes the names of documents found by a search and information indicating a directory storing each document. For example, a URL "http://<IP address of server>/Devlp/maier/A/picture.txt" is included in the search result.

In FIG. 10, the display color of the document 1042 is reversed, which indicates that the document 1042 is currently selected by the user.

An Open button 1050 at the bottom is used for displaying documents or directories in the browser screen. When the user presses the Open button 1050, documents stored in the selected directory or directories are displayed, in the manner shown in FIG. 10.

A Close button 1051 has an opposite function to the Open button 1050 and is used for hiding the documents stored in the selected directory or directories in the browser screen.

A Print button 1052 is used for starting printing of a selected document, for example, the document 1042. When the user presses the Print button 1052, the reference print controller 424 shown in FIG. 4 controls the HTTP client 422 so as to transmit a request for downloading document information of the selected document to the server PC 110.

When the download request is transmitted, information about the location of the document is also transmitted to the server PC 110. In this case, the document search result displayed in a browser screen 1000 in FIG. 10 is used. That is, directory information, the file name, and so forth of the document selected by the user are transmitted to the server PC 110 together with the download request.

A triangle button 1053 and an inverted-triangle button 1054 are used for switching the browser screen 1000 so as to display hidden directories or documents (if any).

The user can check a list of documents found by a keyword search and can check a directory storing each document by seeing the browser screen 1000 shown in FIG. 10. For example, when a plurality of documents having the same names are found, the user can identify each document and guess the content of each document by referring to a directory storing each document.

The browser screen 1000 shown in FIG. 10 is only an example, and other types of browser screens may be used. For example, a browser screen using another display method or a browser screen for displaying buttons for performing other functions may be used.

In the above-described embodiment, the printer 120 transmits a document search request to only the server PC 110. Alternatively, the printer 120 may transmit a document search request to a plurality of servers, for example, to the server PCs 110, 111, and 112, so that documents stored in each server can be searched.

Figure 11:
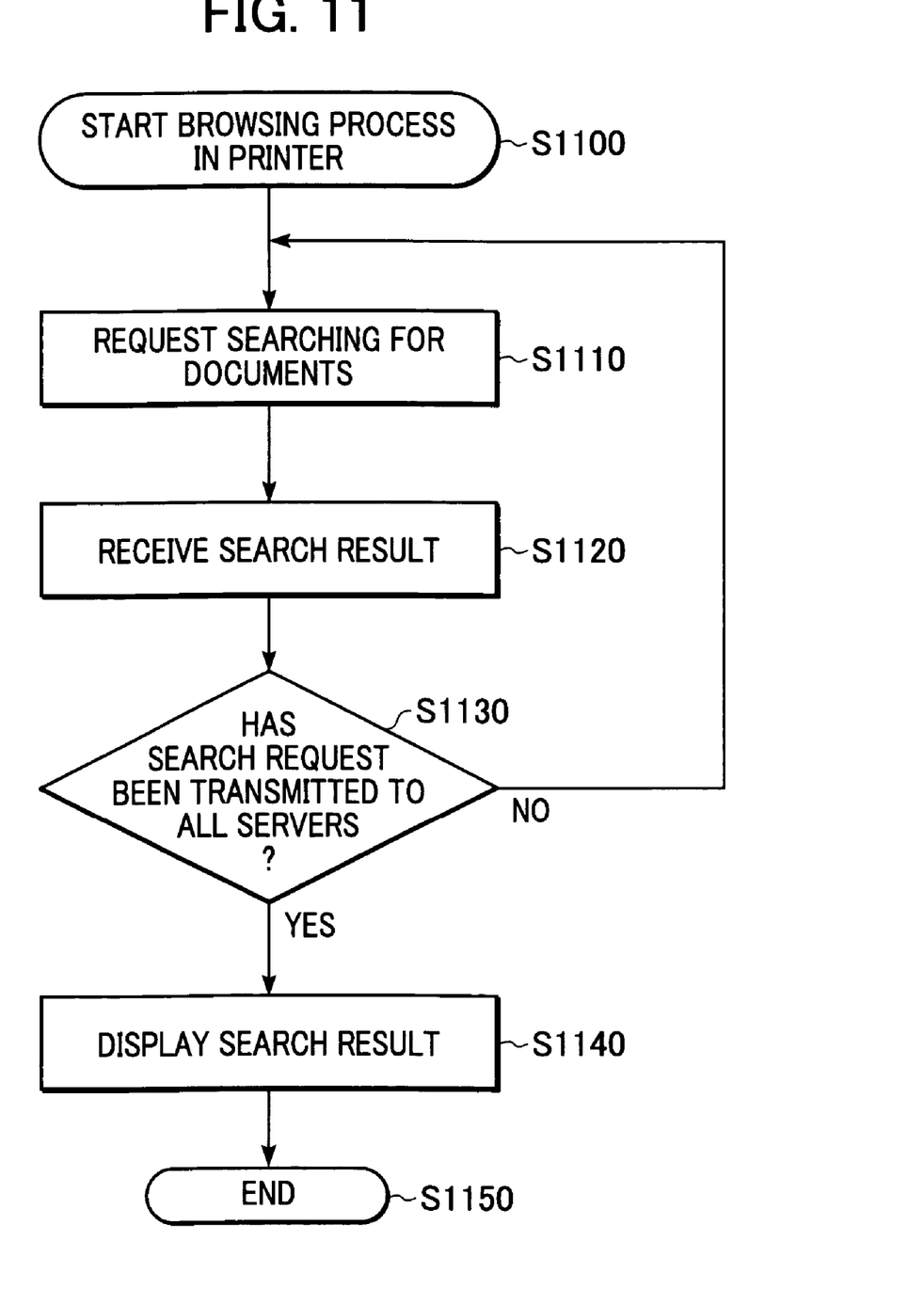
FIG. 11 is a flowchart illustrating a browsing process when a document search request is transmitted to a plurality of servers.

FIG. 11 is a flowchart showing a browsing process when a document search request is transmitted to a plurality of servers. For example, the CPU of the printer 120 executes the process based on a program according to the flowchart shown in FIG. 11.

First, a browsing process in the printer is started in step S1100. Then, the LDAP client 423 of the printer 120 transmits a document search request to the server PC 110, for example. Then, in step S1120, the printer 120 performs a process for receiving a document search result from the server PC 110. In this case, the search result includes server identification information for identifying the server PC 110.

Then, in step S1130, it is determined whether a document search request has been transmitted to all servers. If the document search request has been transmitted to all the servers, the process proceeds step S1140. Otherwise, the process returns to step S1110. For example, if a document search request has not been transmitted to the server PC 111, the process returns to step S1110, where the request is transmitted to the serve PC 111.

In step S1140, the printer 120 displays a list of documents based on search results received from the plurality of servers in the UI 425 shown in FIG. 4, and then the browsing process is completed (step S1150).

Figure 12:
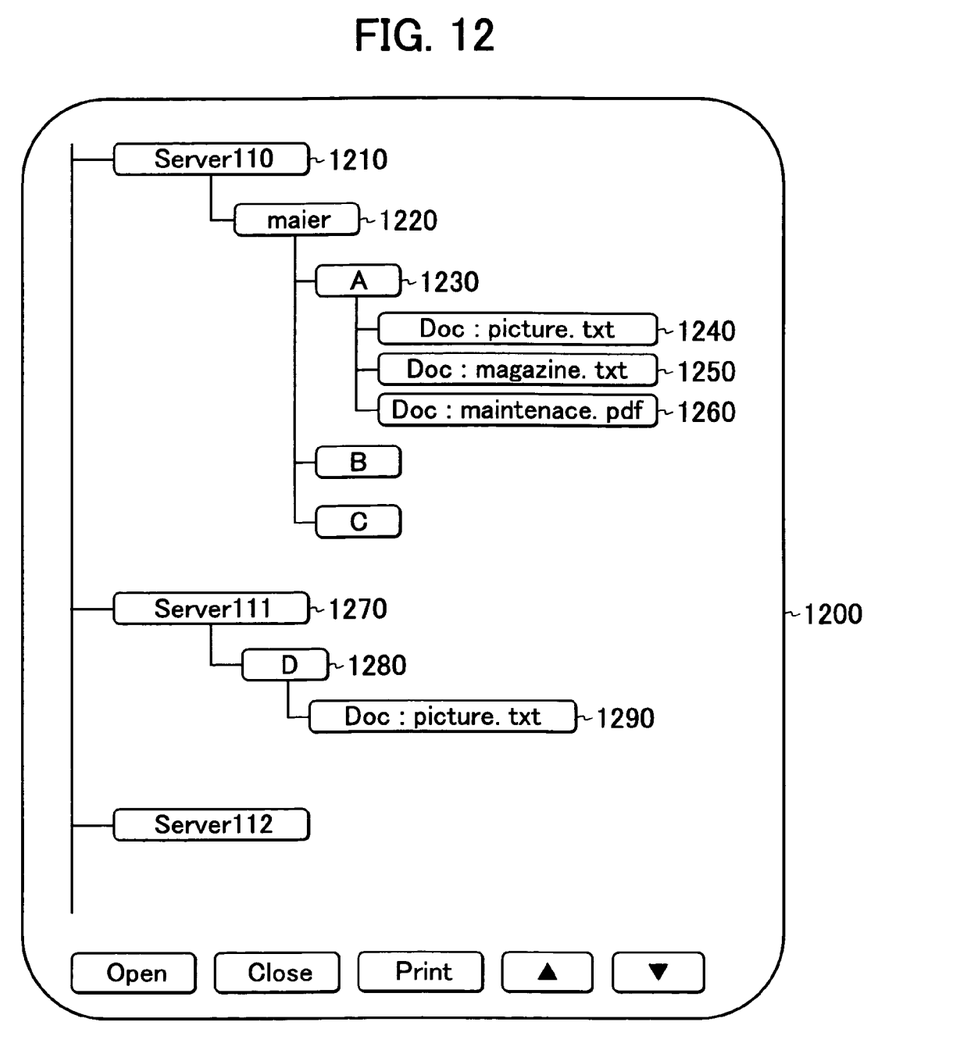
FIG. 12 shows an example of a browser screen displayed in the printer to the user.

FIG. 12 shows an example of the UI 425 shown in FIG. 4. In FIG. 12, a list of documents based on the search results received by the LDAP client 423 is shown. A difference from FIG. 10 is that a list of documents obtained by a search in each of the plurality of servers is displayed. Directories 1210, 1220, and 1230 are in the server PC 110. Documents 1240, 1250, and 1260 have been found by a search in the server PC 110. Also, directories 1270 and 1280 are in the server PC 111. A document 1290 has been found by a search in the server PC 111.

By seeing a screen 1200 shown in FIG. 12, the user can check a list of documents in the servers found by the keyword search.

Figure 13:
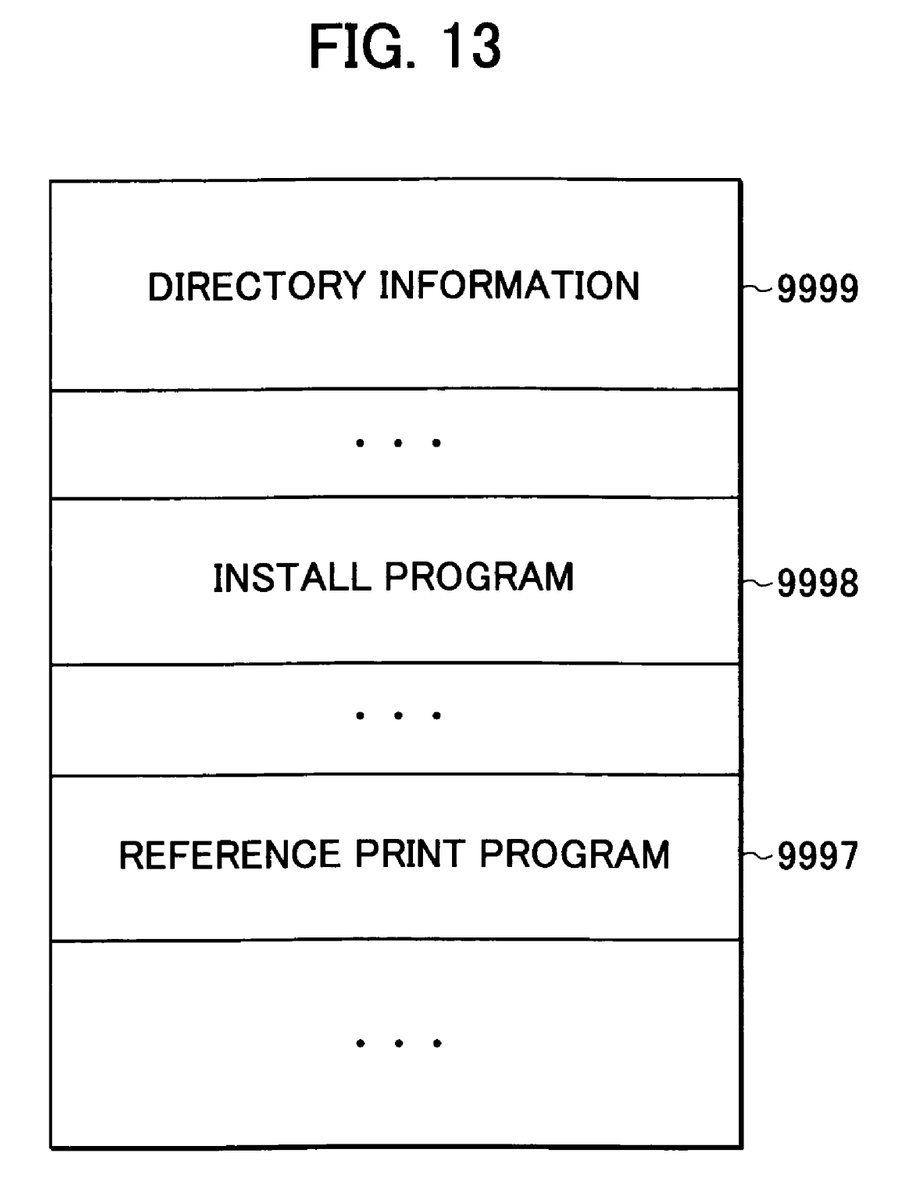
FIG. 13 shows a memory map of a CD-ROM, which is an example of a recording medium.

FIG. 13 shows a memory map of a CD-ROM, which is an example of a recording medium. Reference numeral 9999 in FIG. 13 denotes an area in which directory information of documents is recorded. Reference numeral 9998 denotes an area for recording an install program, and reference numeral 9997 denotes an area for recording a reference print program.

The location information of the install program recording area 9998 and the reference print program recording area 9997 is stored in the directory information recording area 9999.

When a program for operating the print system 10 of the embodiment is installed into the printer 120, the install program recorded in the area 9998 shown in FIG. 13 is read by the CPU 301 and is then loaded into the ROM 302 shown in FIG. 3. Then, the CPU 301 executes the install program loaded into the ROM 302, reads out the reference print program from the area 9997, and stores the reference print program in the hard disk 311.

The configuration of the print system 10 of the present invention is not limited to that according to the above-described embodiment. Alternatively, the function of the print system 10 may be applied to a system or an integrated device including a plurality of devices (for example, a host computer, an interface, and a reader), or may be applied to a single device.

Also, in the embodiment, the SFP 120 or the MFP 123 serving as a printer directly transmits a search request or transfers a selected document to the server PC 110. Alternatively, for example, the search request or the like may be transmitted by the user terminal 121 or 122, so that necessary information is transmitted to the server PC 110.

Further, a recording medium containing program codes of software for realizing the functions of the print system 10 of the above-described embodiment may be supplied to a system or a device, and a computer (CPU or MPU) of the system or the device may read and execute the program codes stored in the recording medium, so that the object of the present invention can be achieved.

In this case, the program codes read from the recording medium realize the functions of the present invention, and thus the recording medium containing the program codes is included in the present invention.

The recording medium for supplying the program codes includes a floppy disk, a hard disk, an optical disk, a magneto-optical disk, a CD-ROM, a CD-R, a magnetic tape, a non-volatile memory card, and a ROM.

The functions of the above-described embodiment may be realized by executing the program codes read by the computer. Also, the functions of the above-described embodiment may be realized when an OS operating in the computer executes part or whole of actual processing based on the instructions of the program codes.

Further, after the program codes read from the recording medium have been written in a memory provided in an expansion board inserted to the computer or an expansion unit connected to the computer, a CPU or the like provided in the expansion board or the expansion unit may execute part or whole of actual processing based on the instructions of the program codes, so that the functions of the above-described embodiment can be realized.

Of course, the present invention can be applied to a case where software program codes for realizing the functions of the above-described embodiment recorded in a recording medium are supplied to a user through a communication line, such as PC communication.

As described above, according to the present invention, documents stored in a document server connected through a network are searched for, a desired document is selected from among the found documents, and the selected document is downloaded to a printer. Accordingly, a document searching function and a printing function of a print system can be organically connected.

With this configuration, when a user specifies a document to be printed in a browser screen, in which a search result is displayed, a desired document can be printed, and the user need not manually write down a storage location of the document, so that a user-friendly print system can be obtained.

Further, the user need not perform manual key inputting of storage location of a document to be printed, and thus an input error can be prevented.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer capable of communicating with a plurality of document servers, the printer having a user interface for inputting and outputting data by a user, the printer comprising:

an input unit configured to input a search condition for searching a desired document;

a transmitting unit configured to transmit the search condition input by the input unit to the plurality of document servers;

a receiving unit configured to receive, from each of a first document server and a second document server that store a document satisfying the search condition among the plurality of document servers, a name of a document which satisfies the search condition and directory information indicating a directory where the document is stored;

a display unit configured to display a list of the document name and the directory information received from the first document server and the document name and the directory information received from the second document server on a same screen;

a document obtaining unit configured to obtain the document selected by the user from the list displayed on the screen by the display unit, from the document server storing the selected document; and a printing unit configured to print the document obtained by the document obtaining unit.

2. A printer according to claim 1, wherein the search condition includes a keyword, and the plurality of document servers search for at least one document corresponding to the keyword.

3. A printer according to claim 1, wherein the obtaining unit obtains the document selected out of the names of the documents displayed by the display unit by transmitting a document request in which document identification information for identifying the document is specified to the document server storing the selected document.

4. A printer according to claim 1, wherein the display unit displays, so that the user can confirm the directory and the document server which store the document satisfying the search condition, the document name received from the first document server, the directory information indicating the directory where the document is stored and identification information of the first document server such that these informations are associated with each other, and displays the document name received from the second document server, the directory information indicating the directory where the document is stored and identification information of the second document server such that these informations are associated with each other.

5. A print system in which a printer is connected to a plurality of document servers, the printer having a user interface for inputting and outputting data by a user, the system comprising:
- an input unit configured to input a search condition for searching a desired document;
- a transmitting unit configured to transmit the search condition input by said input unit to the plurality of document servers:
- a receiving unit configured to receive, from each of a first document server and a second document server that store a document satisfying the search condition among the plurality of document servers, a name of a document which satisfies the search condition and directory information indicating a directory where the document is stored;
- a display unit configured to display a list of the document name and the directory information received from the first document server and the document name and the directory information received from the second document server on a same screen;
- a document obtaining unit configured to obtain, the document selected by the user from the list displayed on the screen by the display unit, from the document server storing the selected document; and
- a printing unit configured to print the document obtained by the document obtaining unit.

6. A method of printing with a printer capable of communicating with a plurality of document servers and having a user interface for inputting and outputting by a user, the method comprising:
- inputting a search condition for searching a desired document;
- transmitting the search condition input by the input unit to the plurality of document servers;
- receiving, from each of a first document server and a second document server that store a document satisfying the search condition among the plurality of document servers, a name of a document which satisfies the search condition and directory information indicating a directory where the document is stored;
- displaying a list of the document name and the directory information received from the first document server and the document name and the directory information received from the second document server on a same screen;
- transferring, from the document server storing the selected document, the document selected by the user from the list displayed on the screen in the displaying step; and
- printing by the printer the document received from the document server.

7. A printing method according to claim 6, wherein the search condition includes a keyword, and the plurality of document servers search for at least one document corresponding to the keyword.

8. A printing method according to claim 6, wherein, in the document transfer step, the document selected out of the names of the documents displayed in the display step is transferred by transmitting a document request in which document identification information for identifying the document is specified to the document server storing the selected document.

* * * * *